2,421,657

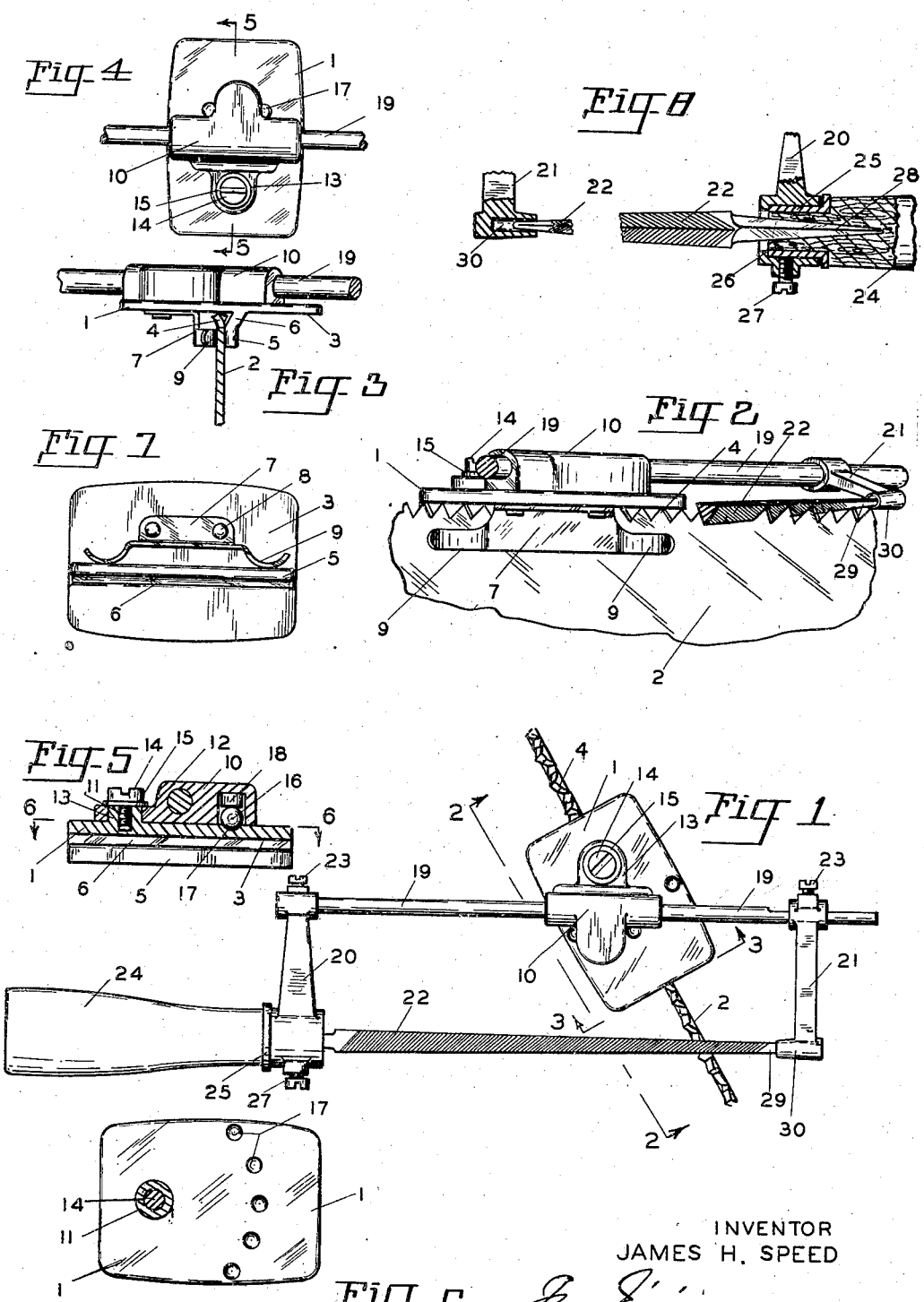
June 3, 1947. J. H. SPEED 2,421,657
HAND SAW FILING GUIDE
Filed April 22, 1946
INVENTOR
JAMES H. SPEED
ATTORNEY Patented June 3, 1947

UNITED STATES PATENT OFFICE 2,421,657

HANDSAW FILING GUIDE

James H. Speed, Portland, Oreg., assignor to Speed Corporation, a corporation of Oregon Application April 22, 1946, Serial No. 664,004

2 Claims. (Cl. 76—36)

This invention relates to saw filers and is particularly adapted to be used for the filing of hand saws and the like.

The primary object of the invention is to provide a file holder and guide that can be slidably clamped to the toothed edge of the saw maintaining the file at a predetermined angle to the saw while filing the teeth.

A further object of the invention is to provide a file holder and guide for filing the teeth of a saw by hand, said device maintaining the file at a predetermined angle to the saw.

A still further object of the invention is the provision of a clamp provided with a spring tension for maintaining the device to the saw by frictional engagement, the said clamp having a rotatable head pivotally mounted thereon providing a guide for the file holder.

Another object of the invention is the provision of a file holder that can be adjusted for the length of any file and that will permit the file to be rotated about its axis and held in any desired position.

These and other incidental objects will be apparent in the drawings, specification and claims.

Referring to the drawings:

Figure 1 is a plan view of my new and improved hand saw filing guide applied to a fragment of a saw.

Figure 2 is a sectional view of the guide taken on line 2—2 of Figure 1 illustrating how the clamp is applied to the saw and how the file is guided through the teeth.

Figure 3 is an end sectional view of the saw having my file guide mounted thereon and taken on line 3—3 of Figure 1.

Figure 4 is a plan view of the clamp with a fragment of the file guide mounted therein.

Figure 5 is a sectional view taken through the line 5—5 of Figure 4 made to illustrate how the guide is pivotally mounted to the clamp.

Figure 6 is a sectional plan view taken on line 6—6 of Figure 5 looking down on the clamp.

Figure 7 is an inverted plan view of Figure 6 illustrating the principle of the clamp.

Figure 8 is a fragmentary view of the file holder partially broken away for convenience of illustration.

In the drawings:

My new and improved file guide consists of a clamp 1 to be mounted upon the saw 2, the underside 3 contacting the points 4 of the teeth of the saw. A guide bar 5 extends from the clamp or base 1 at right angles and contacts the side of the saw 2, best illustrated in Figure 3, this guide is offset at 6 to avoid the teeth 4 of the saw when moved along the same. A spring clamp 7 is mounted to the clamp 1 by suitable fastening means, as rivets 8.

Fingers 9 bear against the side of the saw opposite to the guide 5, said fingers being made of spring material and forming part of the spring clamp 7. The clamp 7 is so offset as to avoid contacting the teeth 4, best illustrated in Figure 3.

A head 10 is pivotally mounted to the clamp 1 around the boss 11 which forms part of the clamp and extends upwardly therefrom. The head has a hole 12 formed within the base portion 13 for encircling the boss 11. This assembly is held in place by the locking screw 14 which is cinched against the upper end of the boss 11, sufficient clearance being allowed under the washer 15 to permit the rotation of the head 10 thereunder. The head 10 is maintained at a number of desired locations around the boss 11 by the action of the ball 16 engaging the depressions 17 formed on the upper surface of the clamp 1. The ball is maintained within these depressions by the action of the rubber cushion 18. A spring may be used instead of this rubber cushion, the purpose of the same being to maintain the ball within the depression 17 and holding the head 10 at any fixed angle relative to the clamp 1.

Working freely through the head 10 is a guide rod 19 upon which is mounted two arms 20 and 21. These arms hold the file 22 and they are adjustable along the guide rod 19 and locked at any desired position by the set screws 23. The arm 20 holds the handle 24, the handle 24 has a ferrule 25 fitted to its end 26. This ferrule is held within the arm 20 by the set screw 27. The file is driven into the handle at 28 similar to a regular file handle, the arm 21 is then adjusted along the guide rod 19 so that the end 29 of the file enters the socket 30 of the arm 21 holding the file in line with this arm.

I will now describe the operation of my new and improved hand saw filing guide. The clamp 1 is mounted on the tooth side of the saw. The fingers 9 of the spring assembly 7 and the guide bar 5 of the clamp maintains the clamp in frictional engagement with the saw, this friction being sufficient to hold the same against movement until positively moved by the operator. The head 10 is then rotated about the boss 11 of the clamp to the desired angle, as for instance that shown in Figure 1. The ball 16 locking and holding the same at this angle.

In the filing of the saw the operator takes a hold of the handle 24 and the guide rod 19 in the neighborhood of the arm 21 and forces the file through across the teeth, which will be the angle relative to the teeth being filed, or to the angle that it is intended to shape the teeth. After the tooth has been filed the operator pushes the clamp along the saw to the next tooth to be filed. When he comes to the end of the saw, the file 22 and the arms 20 and 21 can be revolved to the opposite side of the clamp, the set screw 27 being loosened allowing the file handle to be rotated so as to bring the proper edge of the file in contact with the teeth. It can be seen from the above description that the device permits angle adjustment relative to the center line of the saw and at the same time it allows the file guide to be rotated 90 degrees, or to the opposite side of the clamp in the filing operation.

I do not wish to be limited to the exact structure as other mechanical equivalents may be substituted still coming within the scope of my claims.

What I claim is:

1. A saw filing device, comprising a clamp, said clamp comprising a plate having a depending fixed rib to engage one face of a saw, a resilient element located opposite the rib and secured to the plate, the resilient element having its ends bowed toward the saw face to engage the opposite face of the saw, a guide pivoted to the top of the plate, said guide formed with an opening, a ball in the opening, a resilient element engaging the ball to press it toward the plate, a series of depressions formed in the plate to receive the ball, whereby to hold the guide in adjusted position, a file carrying frame including a rod which passes through the guide, and means on the frame for carrying a file parallel with the rod and guide.

2. A saw filing device, comprising a clamp, said clamp including a top plate to fit over the edges of the saw teeth, an integral rib depending from the plate and having an inclined face to avoid the saw teeth and a flat surface to engage one face of the saw below the teeth, a resilient element opposite the rib, said element having its ends bowed toward the saw, said bowed ends engaging the opposite face of the saw, an adjustably mounted guide mounted on the plate, and a file carrying frame reciprocally mounted in the guide.

JAMES H. SPEED.

REFERENCES CITED

The following references are of record in the file of this patent:

UNITED STATES PATENTS

| Number | Name | Date |
| --- | --- | --- |
| 23,655 | Beardsley | Apr. 19, 1859 |
| 542,282 | Rood | July 9, 1895 |
| 1,900,084 | Waller | Mar. 7, 1933 |
| 2,019,330 | Altman | Oct. 29, 1935 |
| 1,165,248 | Hanson | Dec. 21, 1915 |
| 2,171,169 | Woodbury | Aug. 29, 1939 |
| 2,340,096 | Woodbury et al. | Jan. 25, 1944 |